United States Patent
Nishiyama

(10) Patent No.: US 8,774,545 B2
(45) Date of Patent: Jul. 8, 2014

(54) IMAGE PROCESSING APPARATUS AND IMAGE PROCESSING METHOD WITH WEIGHTED VECTORS FOR FILTERING

(75) Inventor: Tomohiro Nishiyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 127 days.

(21) Appl. No.: 13/313,524

(22) Filed: Dec. 7, 2011

(65) Prior Publication Data

US 2012/0155784 A1 Jun. 21, 2012

(30) Foreign Application Priority Data

Dec. 20, 2010 (JP) ................................ 2010-283729

(51) Int. Cl.
*G06K 9/40* (2006.01)

(52) U.S. Cl.
USPC ........................................................ 382/260

(58) Field of Classification Search
USPC ......... 382/260–269, 199, 274–276, 254–255, 382/240, 162, 167, 298–300; 348/208.4–208.6, 208.99, 218.1, 246, 348/252, 584, 294, 242
See application file for complete search history.

(56) References Cited

U.S. PATENT DOCUMENTS

| | | | | |
|---|---|---|---|---|
| 5,241,372 A | * | 8/1993 | Ohba | 348/578 |
| 7,680,353 B2 | * | 3/2010 | Jojic et al. | 382/254 |
| 8,036,494 B2 | * | 10/2011 | Chen | 382/299 |
| 8,345,130 B2 | * | 1/2013 | Adams et al. | 348/251 |
| 8,411,980 B1 | * | 4/2013 | Wang et al. | 382/254 |
| 2002/0172431 A1 | * | 11/2002 | Atkins et al. | 382/260 |
| 2003/0048368 A1 | * | 3/2003 | Bosco et al. | 348/272 |
| 2004/0120598 A1 | * | 6/2004 | Feng | 382/263 |
| 2010/0262425 A1 | * | 10/2010 | Tanabe et al. | 704/233 |

FOREIGN PATENT DOCUMENTS

| | | |
|---|---|---|
| JP | 2005-031759 A | 2/2005 |
| JP | 2005-063323 A | 3/2005 |

OTHER PUBLICATIONS

Lukac et al, Selection weighted vector directional filters, Computer Vision and Image Understanding 94 (2004) 140-167.*
Nishimiya et al, Image Restoration by Using Multiple Wiener Filters, Electronics and Communications in Japan, Part 3, vol. 85, No. 8, 2002.*

* cited by examiner

*Primary Examiner* — Andrae S Allison
(74) *Attorney, Agent, or Firm* — Fitzpatrick, Cella, Harper & Scinto

(57) ABSTRACT

A plurality of representative filters are held, and weight vectors containing weight values for the respective representative filters as components are acquired for respective pixels which form an image. The respective representative filters act on the respective pixels which form the image, and the results of the action are weighted with the weight vectors and added.

19 Claims, 15 Drawing Sheets

F I G. 15

| 0 | 0.2 | 0 |
|---|---|---|
| 0.1 | 0.2 | 0.3 |
| 0 | 0.2 | 0 |

IMAGE PROCESSING APPARATUS AND IMAGE PROCESSING METHOD WITH WEIGHTED VECTORS FOR FILTERING

BACKGROUND OF THE INVENTION

1. Field of the Invention

The present invention relates to a filter processing technique.

2. Description of the Related Art

Recently, digital cameras have achieved higher image qualities of more than 20,000,000 pixels, and can capture high-quality images at high resolution. However, while the user presses the shutter, the camera may shake or a blur may occur owing to the optical system or out-of-focusing. In this case, the image quality degrades and the advantage of high image quality cannot be fully exploited.

To improve poor image quality, there is proposed a method for recovering an image by applying, to the image, filters different between respective pixels (areas), such as a shake filter against camera shake, an optical filter corresponding to the image height of a lens, and a blur filter corresponding to the object distance (patent literature 1 (Japanese Patent Laid-Open No. 2005-63323)).

There is also proposed a method of holding not all filters different between respective pixels but only representative filters, and generating the remaining filters by linear interpolation (patent literature 2 (Japanese Patent Laid-Open No. 2005-31759)).

However, the method in patent literature 1 needs to hold all filters different between respective pixels and thus requires a large memory capacity. The method in patent literature 2 generates a filter between representative filters simply by linear interpolation. However, linear interpolation decides the weight based on the distance between filters. When the filter characteristic does not change depending on the distance, no intermediate filter can be generated at high precision. Also, the method in patent literature 2 can reduce the data amount of filters to be held, but cannot decrease the operation amount used when filters act on an image.

SUMMARY OF THE INVENTION

The present invention has been made to overcome the conventional drawbacks, and provides a technique for reducing the data amount of filters to be held and reducing the operation amount used when filters act on an image.

According to the first aspect of the present invention, an image processing apparatus comprises: a holding unit that holds a plurality of representative filters; a unit that acquires, for respective pixels which form an image, weight vectors containing weight values for the respective representative filters as components; a unit that causes the respective representative filters to act on the respective pixels which form the image; and a unit that weights results of the action with the weight vectors and adds the results.

According to the second aspect of the present invention, an image processing method to be performed by an image processing apparatus which holds a plurality of representative filters, comprises the steps of: acquiring, for respective pixels which form an image, weight vectors containing weight values for the respective representative filters as components; causing the respective representative filters to act on the respective pixels which form the image; and weighting results of the action with the weight vectors and adding the results.

Further features of the present invention will become apparent from the following description of exemplary embodiments with reference to the attached drawings.

BRIEF DESCRIPTION OF THE DRAWINGS

FIG. 15 is a view exemplifying a filter.

DESCRIPTION OF THE EMBODIMENTS

Embodiments of the present invention will now be described with reference to the accompanying drawings. Embodiments to be described hereinafter are merely examples when the present invention is practiced, and are some of practical embodiments of the arrangements described in the scope of the claims.

First Embodiment

Example of Functional Arrangement of Image Processing Apparatus

Figure 5:
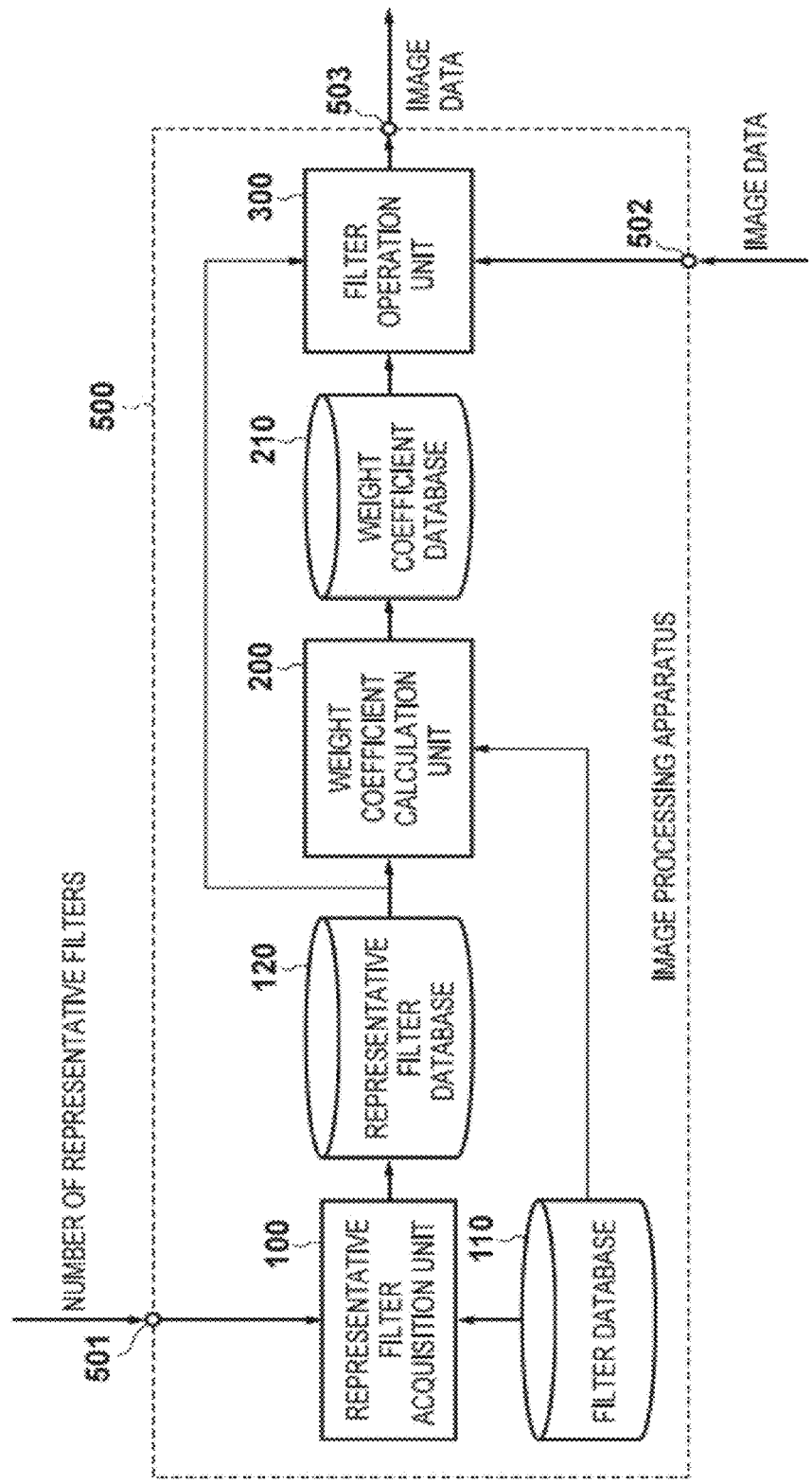
FIG. 5 is a block diagram exemplifying the functional arrangement of the image processing apparatus.

The functional arrangement of an image processing apparatus according to the first embodiment will be exemplified with reference to the block diagram of FIG. 5. An image processing apparatus 500 acquires the number N of representative filters (to be described later) via a terminal 501, and acquires an input image via a terminal 502. The image processing apparatus 500 outputs an image having undergone filter processing via a terminal 503. Respective units in the image processing apparatus 500 will be explained separately with reference to FIGS. 1 to 3.

Figure 1:
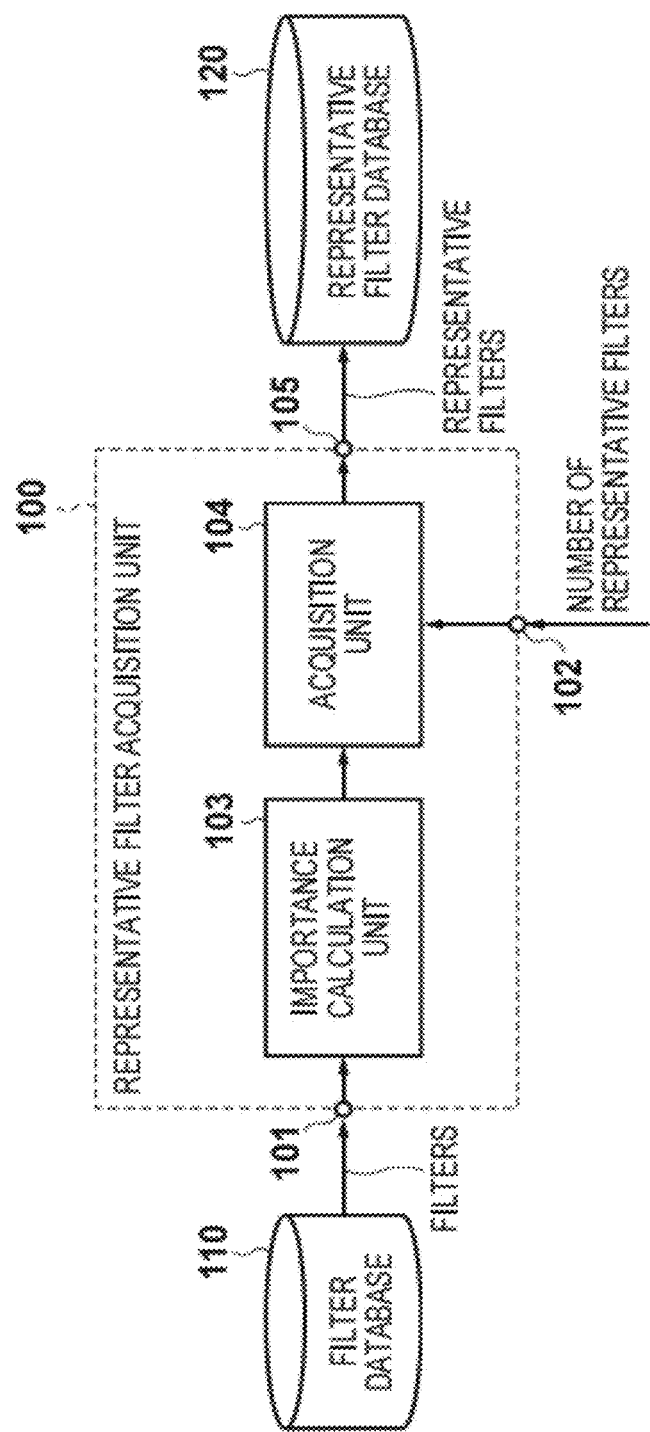
FIG. 1 is a block diagram exemplifying the functional arrangement of an image processing apparatus.
Figure 2:
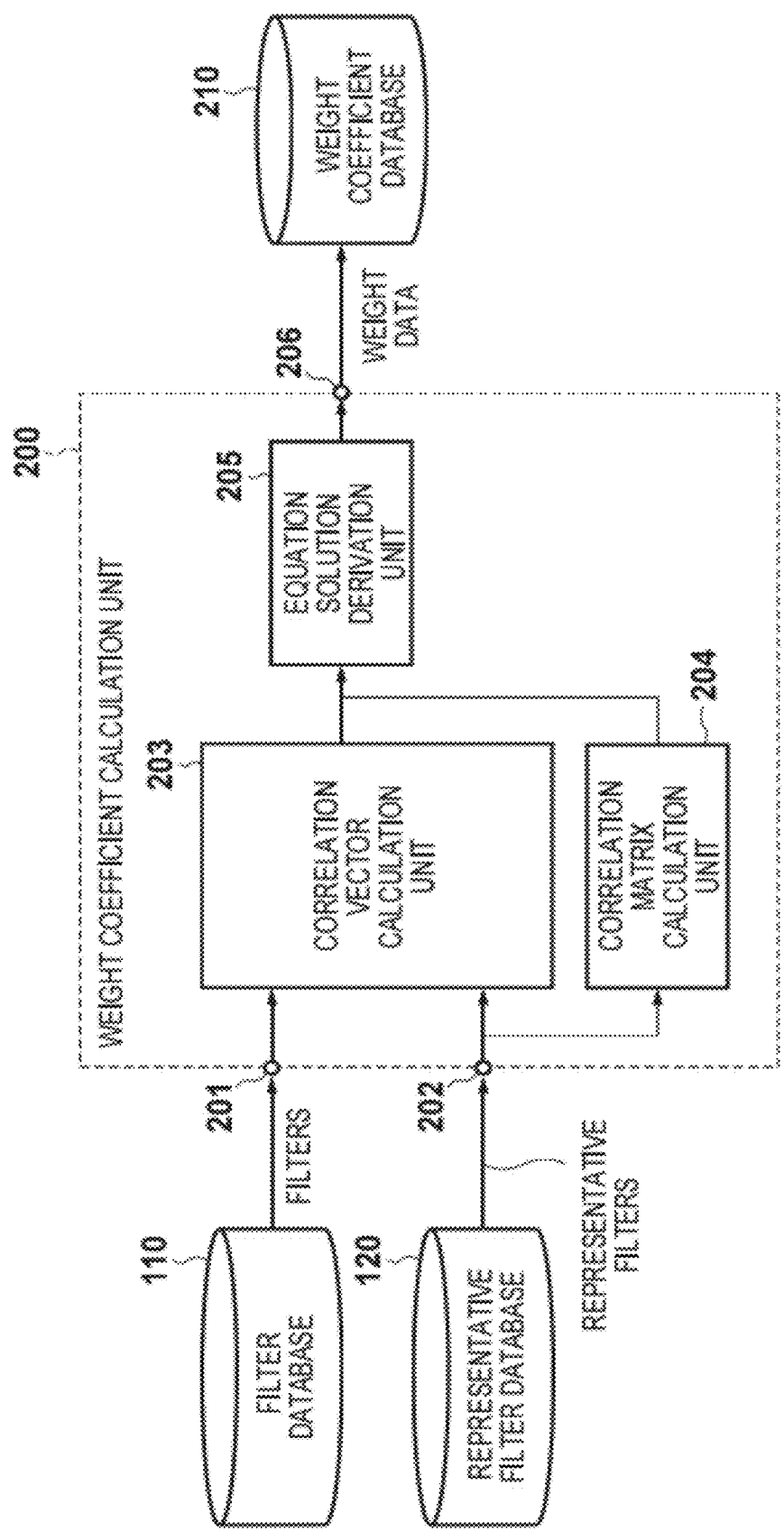
FIG. 2 is a block diagram exemplifying the functional arrangement of the image processing apparatus.
Figure 3:
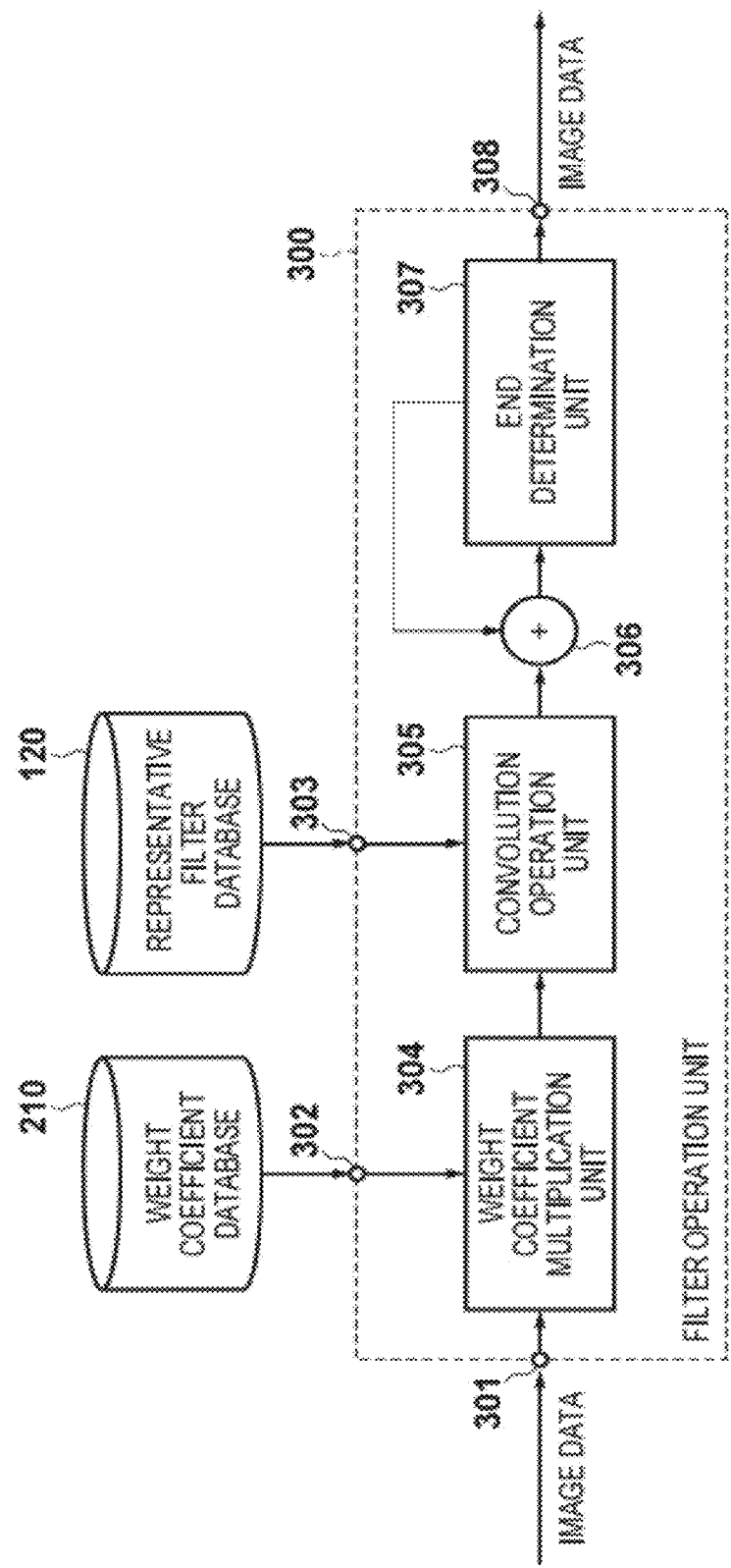
FIG. 3 is a block diagram exemplifying the functional arrangement of the image processing apparatus.

In the embodiment, however, the respective arrangements shown in FIGS. 1 to 3 need not always be assembled into one apparatus and may be assembled separately into an appropriate number of apparatuses. In this case, the respective apparatuses perform cooperative operations to implement each processing to be described later.

First, the arrangement shown in FIG. 1 will be explained. The arrangement shown in FIG. 1 is configured to select, as representative filters from filters set in advance for respective pixels which form an image, main filters which approximate these filters.

Filters to be applied to pixels are registered in a filter database 110 for respective pixels which form an image (filter holding). The filter database 110 may be arranged in the image processing apparatus or an external apparatus. A representative filter acquisition unit 100 includes an importance calculation unit 103, an acquisition unit 104, and terminals 101, 102, and 105.

The importance calculation unit 103 reads out, via the terminal 101, filters for respective pixels that are registered in the filter database 110. The importance calculation unit 103 calculates importances for the respective readout filters. Processing of calculating an importance will be described later.

The acquisition unit 104 acquires the number N of representative filters via the terminal 102. The number N of representative filters may be held in advance in the image processing apparatus, input by the user, or acquired from an external apparatus. The acquisition unit 104 selects N filters as representative filters in descending order of importance from the filters read out from the filter database 110 by the importance calculation unit 103. At this time, if not all the filters selected as representative filters are equal in size, for example, all the representative filters are resized to the size of a representative filter of highest importance. Then, the acquisition unit 104 registers the selected representative filters in a representative filter database 120 via the terminal 105.

Next, the arrangement shown in FIG. 2 will be described. The arrangement shown in FIG. 2 is configured to obtain, for respective pixels which form an image, weight vectors containing weight values to respective representative filters as components. A weight coefficient calculation unit 200 includes a correlation vector calculation unit 203, a correlation matrix calculation unit 204, an equation solution derivation unit 205, and terminals 201, 202, and 206.

The correlation vector calculation unit 203 reads out, via the terminal 201, filters for respective pixels that are registered in the filter database 110. Also, the correlation vector calculation unit 203 reads out, via the terminal 202, respective representative filters registered in the representative filter database 120. For respective pixels that form an image, the correlation vector calculation unit 203 calculates correlation vectors b indicating correlations between the filters for pixels and the respective representative filters.

The correlation matrix calculation unit 204 reads out, via the terminal 202, respective representative filters registered in the representative filter database 120. The correlation matrix calculation unit 204 calculates a correlation matrix A indicating correlations between the representative filters.

The equation solution derivation unit 205 solves simultaneous equations Aw=b for respective pixels which form an image, obtaining weight vectors w for the respective pixels which form the image. For example, the weight vector w generated for a pixel of interest is a vector by which the correlation matrix A is multiplied in order to obtain the correlation vector b obtained for the pixel of interest and which contains weight values for respective representative filters as components. The equation solution derivation unit 205 registers the weight vectors w obtained for respective pixels as weight data in a weight coefficient database 210 via the terminal 206. Methods of obtaining the correlation vector b, correlation matrix A, and weight vector w, and details of them will be described later.

The arrangement shown in FIG. 3 will be described. The arrangement shown in FIG. 3 is configured to perform filter processing for an input image. A filter operation unit 300 includes a weight coefficient multiplication unit 304, a convolution operation unit 305, a composition unit 306, an end determination unit 307, and terminals 301, 302, 303, and 308.

The weight coefficient multiplication unit 304 acquires image data as an input image via the terminal 301. The weight coefficient multiplication unit 304 multiplies the acquired input image by the weight value of each representative filter registered in the weight coefficient database 210, generating a weight coefficient-multiplied image for each representative filter.

The convolution operation unit 305 executes a convolution operation between a representative filter registered in the representative filter database 120 and the weight coefficient-multiplied image generated by the weight coefficient multiplication unit 304 for the representative filter, generating a convoluted image for each representative filter.

Every time the convolution operation unit 305 generates a convoluted image, the composition unit 306 composites the generated convoluted image with already-generated convoluted images. As a result, a composite image of all convoluted images generated up to this time is generated. Needless to say, the composition timing is not limited to this, and after generating convoluted images for respective representative filters, these convoluted images may be composited simultaneously.

The end determination unit 307 controls the convolution operation unit 305 and composition unit 306 to repeat, by the number N of representative filters, a series of operations of "generating a convoluted image and compositing it with already-generated convoluted images" by the convolution operation unit 305 and composition unit 306. The end determination unit 307 outputs, a composite image generated by repeating the series of operations by the number N of representative filters as image data via the terminal 308. The composite image output destination is not particularly limited, and the composite image may be stored in a memory, output to an external apparatus, or displayed on the display device.

<Processing by Image Processing Apparatus>

Figure 4:
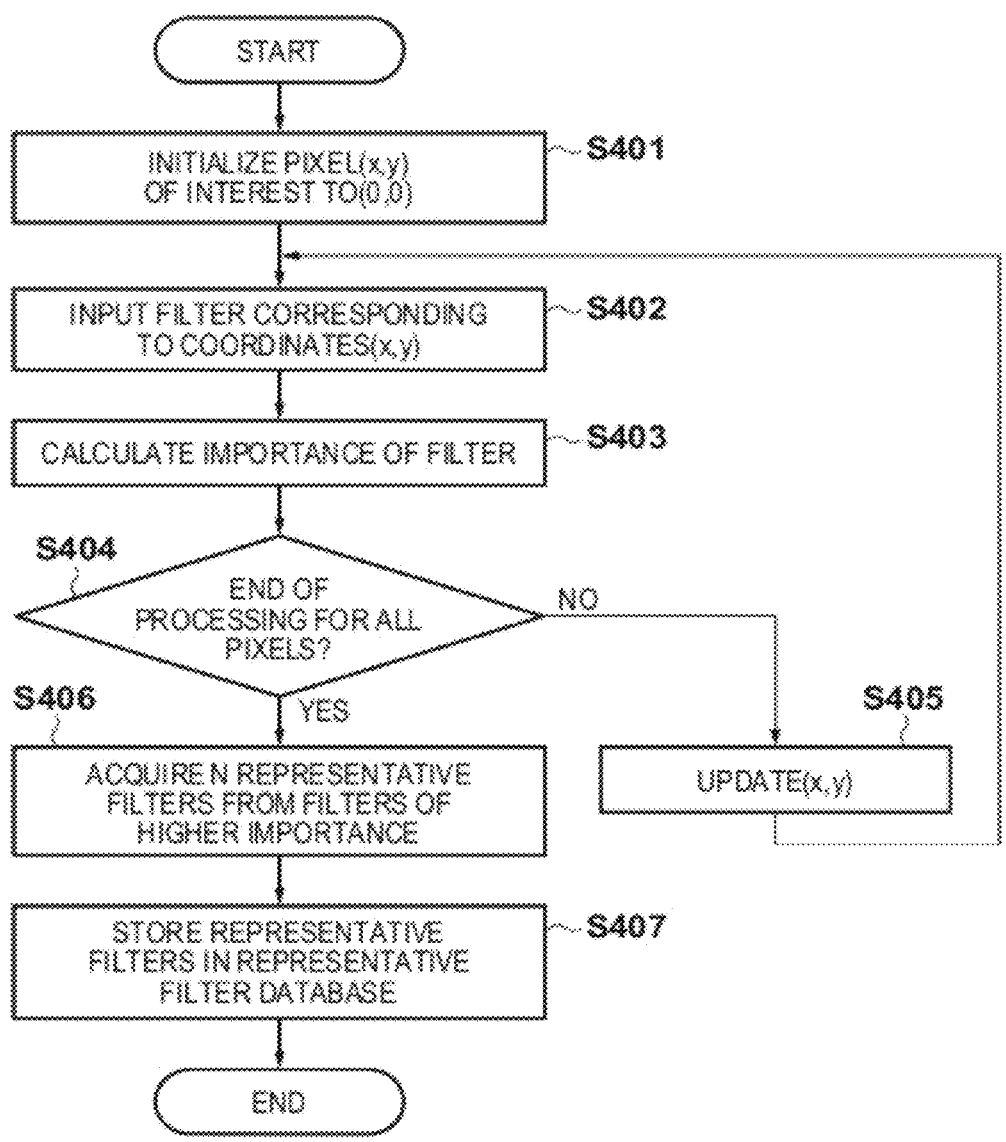
FIG. 4 is a flowchart showing processing by a representative filter acquisition unit 100.

Processing by the representative filter acquisition unit 100 will be described in more detail with reference to FIG. 4 showing the sequence of this processing. In step S401, the importance calculation unit 103 initializes, to 0, variables x and y used as the coordinate position of a pixel of interest in an image of X pixels in the x direction×Y pixels in the y direction. Assume that the coordinate position (x,y)=(0,0) indicates the coordinate position of the upper left corner of the image.

Figure 15:
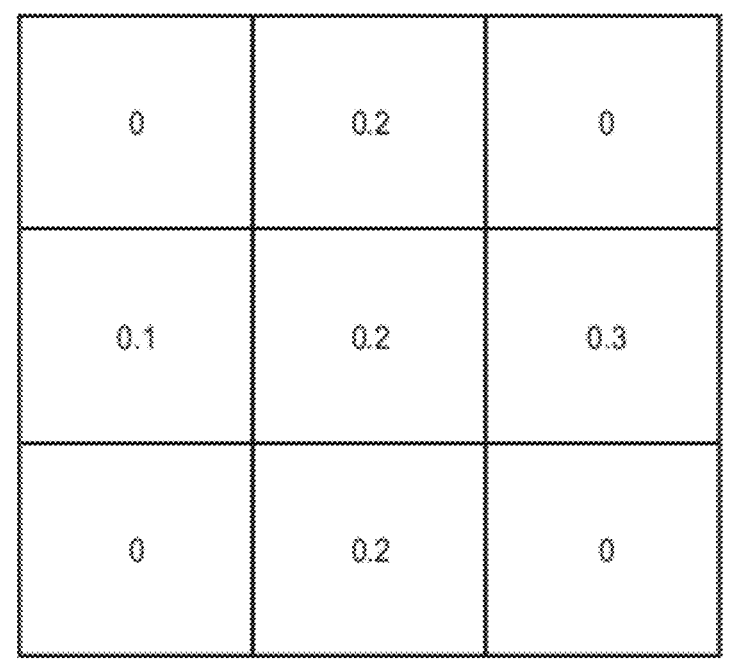

In step S402, the importance calculation unit 103 reads out a filter corresponding to the coordinate position (x,y) from the filter database 110 via the terminal 101. This filter is, for example, a 3×3 filter, as shown in FIG. 15. A filter to be applied to a pixel of interest is formed from coefficients by which pixels including the pixel of interest and its peripheral pixels are multiplied. In step S403, the importance calculation unit 103 calculates the importance of the readout filter. The importance calculation method will be described later.

In step S404, the importance calculation unit 103 determines whether the processes in steps S402 and S403 have been done for all coordinate positions (all pixels). This determination can be made by determining whether x=X−1 and y=Y−1. As a result of the determination, if the importance calculation unit 103 determines that the processes in steps S402 and S403 have been done for all coordinate positions, the process advances to step S406. If the importance calculation unit 103 determines that there is a coordinate position unprocessed in steps S402 and S403, the process advances to step S405.

In step S405, the importance calculation unit 103 increments the value of the variable x or y by one to update it, and sets an unprocessed coordinate position as the coordinate position of a pixel of interest. Assume that the coordinate position is updated from upper left to lower right of the image. The processes in step S402 and subsequent steps are executed for the updated coordinate position.

In step S406, the acquisition unit 104 acquires the number N of representative filters via the terminal 102 and selects N filters as representative filters from filters for respective pixels in descending order of importance. In step S407, the acquisition unit 104 registers the N selected filters in the representative filter database 120 via the terminal 105.

Figure 6:
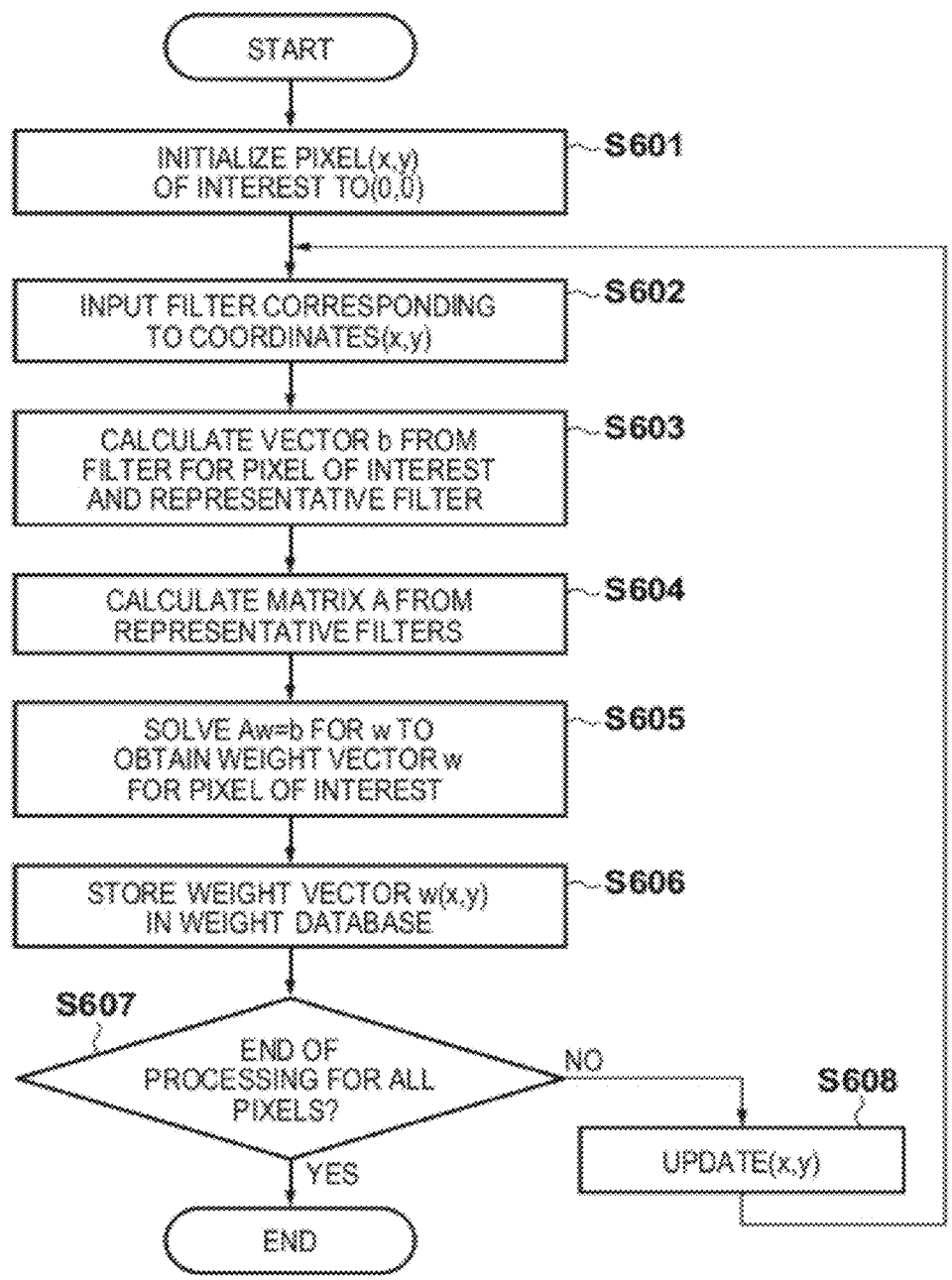
FIG. 6 is a flowchart showing processing by a weight coefficient calculation unit 200.

Processing by the weight coefficient calculation unit 200 will be explained in more detail with reference to FIG. 6 showing the sequence of this processing.

In step S601, the weight coefficient calculation unit 200 initializes, to 0, the variables x and y used as the coordinate position of a pixel of interest in an image of X pixels in the x direction×Y pixels in the y direction. Assume that the coordinate position (x,y)=(0,0) indicates the coordinate position of the upper left corner of the image.

In step S602, the correlation vector calculation unit 203 reads out a filter corresponding to the coordinate position (x,y) from the filter database 110 via the terminal 201.

In step S603, the correlation vector calculation unit 203 first reads out respective representative filters registered in the representative filter database 120 via the terminal 202. Then, the correlation vector calculation unit 203 calculates the correlation vectors b indicating correlations between the filter read out in step S602 and the respective representative filters read out in this step. A method of calculating the correlation vector b will be described later.

In step S604, the correlation matrix calculation unit 204 first reads out, via the terminal 202, respective representative filters registered in the representative filter database 120. Then, the correlation matrix calculation unit 204 calculates the correlation matrix A indicating correlations between the representative filters. A method of calculating the correlation matrix A will be described later. In step S605, the equation solution derivation unit 205 obtains the weight vector w by solving equation (1):

$$Aw=b \qquad (1)$$

The obtained weight vector w is a vector by which the correlation matrix A calculated in step S604 is multiplied in order to obtain the correlation vector b calculated in step S603 and contains weight values for respective representative filters as components. In the embodiment, the weight vector w is a vector having N weight values as elements. The ith ($1 \leq i \leq N$) weight value is a weight value for the ith representative filter (representative filter fi). In this manner, the weight vector w is obtained for each coordinate position and can be represented as w=w(x,y) ($0 \leq x \leq X-1$, $0 \leq y \leq Y-1$).

In step S606, the equation solution derivation unit 205 registers the weight vector w obtained in step S605 in the weight coefficient database 210 via the terminal 206. In step S607, the weight coefficient calculation unit 200 determines whether the processes in steps S602 to S606 have been done for all coordinate positions (all pixels). This determination can be made by determining whether x=X−1 and y=Y−1. As a result of the determination, if the weight coefficient calculation unit 200 determines that the processes in steps S602 to S606 have been done for all coordinate positions, the process ends. If the weight coefficient calculation unit 200 determines that there is a coordinate position unprocessed in steps S602 to S606, the process advances to step S608.

In step S608, the weight coefficient calculation unit 200 increments the value of the variable x or y by one to update it, and sets an unprocessed coordinate position as the coordinate position of a pixel of interest. Assume that the coordinate position is updated from upper left to lower right of the image. The processes in step S602 and subsequent steps are executed for the updated coordinate position.

Figure 7:
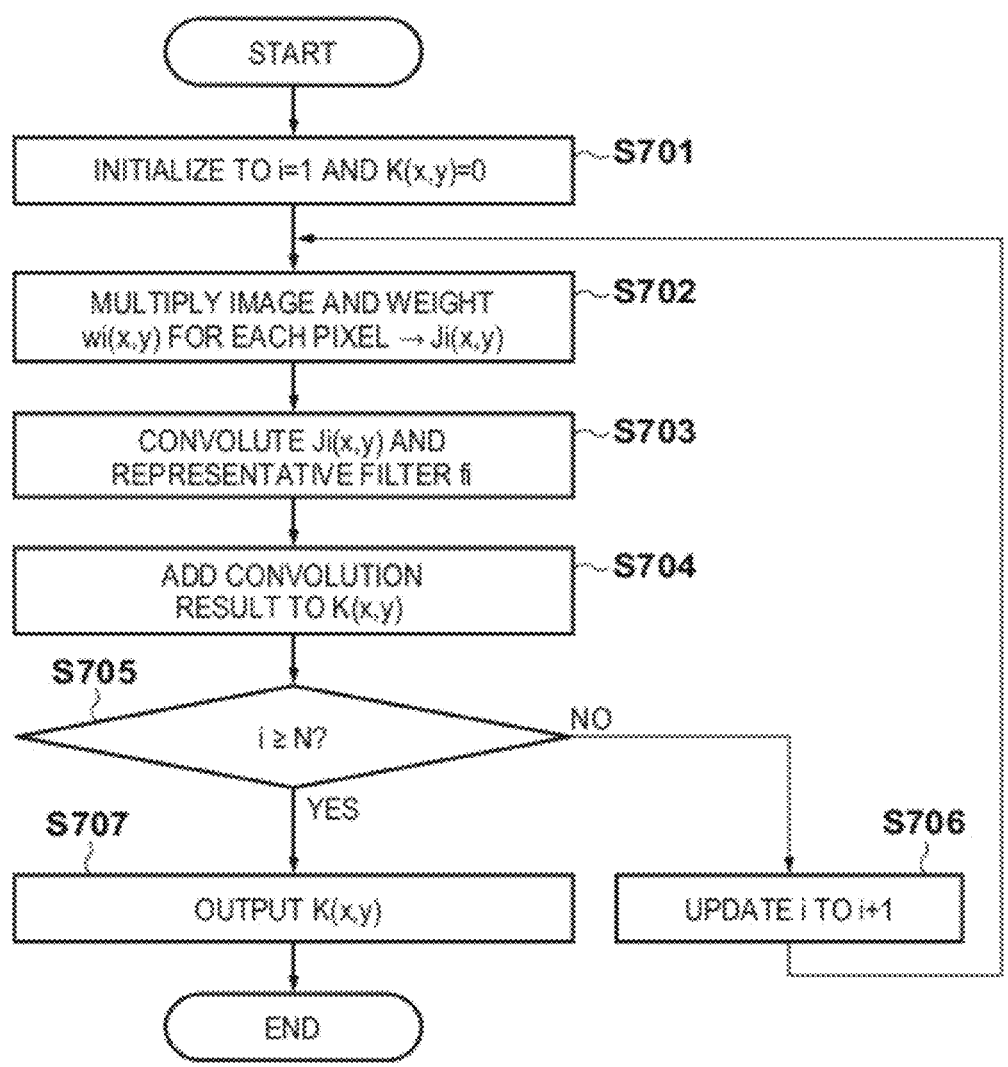
FIG. 7 is a flowchart showing processing by a filter operation unit 300.

Processing by the filter operation unit 300 will be described with reference to FIG. 7 showing the sequence of this processing. In step S701, the filter operation unit 300 initializes, to 1, the value of a variable i used as an index for each representative filter. Further, the filter operation unit 300 initializes, to 0 for all xs and ys which satisfy $0 \leq x \leq X-1$ and $0 \leq y \leq Y-1$, the value of an array K=K(x,y) for storing an image having undergone filter processing.

In step S702, the weight coefficient multiplication unit 304 first acquires, via the terminal 301, an input image of X pixels in the x direction×Y pixels in the y direction. Further, the weight coefficient multiplication unit 304 acquires the ith element (weight value) from the weight vector w obtained for each pixel position in the weight coefficient database 210. For example, wi(x,y) is acquired from the weight vector w(x, y) at the pixel position (x,y)={w1(x,y), . . . , wi(x,y), . . . , wN(x,y)}.

Then, the weight coefficient multiplication unit 304 calculates Ji(x',y')=I(x',y')×wi(x',y') using the pixel value I(x',y') and the weight value wi(x',y') at the pixel position (x',y') in the input image. By executing this calculation for all x's and y's which satisfy $0 \leq x' \leq X-1$ and $0 \leq y' \leq Y-1$, a weight coefficient-multiplied image Ji can be generated by multiplying the input image by a weight value serving as the ith element of each weight vector. Note that Ji(x',y') is a pixel value at the pixel position (x',y') in the weight coefficient-multiplied image Ji.

In step S703, the convolution operation unit 305 first reads out the representative filter fi from the representative filter database 120. The convolution operation unit 305 then performs a convolution operation between Ji(x',y') and fi(x−x', y−y') (calculation of Ji(x,y)*fi(x,y): * is an operator representing a convolution operation).

Since the representative filter fi(x−x',y−y') depends on only a relative distance, this convolution operation can be executed similarly to convolution of a normal filter. The convolution operation may be performed in a real space or a frequency space using equation (2):

$$F^{-1}[F(f_i)F(J_i)] \qquad (2)$$

where F[ ] is the Fourier transform and $F^{-1}[ ]$ is the inverse Fourier transform.

In step S704, the composition unit 306 performs K(x',y')=K(x',y')+{result of the convolution operation between Ji(x', y') and fi(x−x',y−y')} for all x's and y's which satisfy $0 \leq x' \leq X-1$ and $0 \leq y' \leq Y-1$.

In step S705, the end determination unit 307 determines whether the value of the variable i becomes equal to or larger than N. If the value of the variable i≥N as a result of the determination, the process advances to step S707; if the value of the variable i<N, to step S706.

In step S706, the end determination unit 307 increments the value of the variable i by one, and operates the weight coefficient multiplication unit 304, convolution operation unit 305, and composition unit 306. After that, the process returns to step S702.

In step S707, the end determination unit 307 outputs the array K as an image having undergone filter processing via the terminal 308.

<Processing by Importance Calculation Unit 103>

A method of calculating an importance by the importance calculation unit 103 will be explained. The importance calculation unit 103 gives a higher importance to a filter having a larger coefficient value. For example, when the sum of squares of the value of each coefficient in a filter is larger, a higher importance is assigned to this filter. As a matter of course, an element which determines the degree of importance is not limited to this, and other elements are also conceivable. For example, a higher importance may be assigned to a filter having a larger size. In this way, various elements determine the degree of importance, and only one or a plurality of elements may be used.

As representative filters, a predetermined number of filters may be selected from filters for respective pixels in descending order of importance, as described above, but representative filters can be selected by another method. For example, an image is divided into N areas (area size and shape are not particularly limited). Then, a filter of highest importance among filters corresponding to respective pixels in the jth ($1 \leq j \leq N$) area is selected as a representative filter for the jth area. This processing is performed for all js which satisfy $1 \leq j \leq N$. Accordingly, representative filters for the respective areas can be decided and thus N representative filters can be decided.

Figure 8:
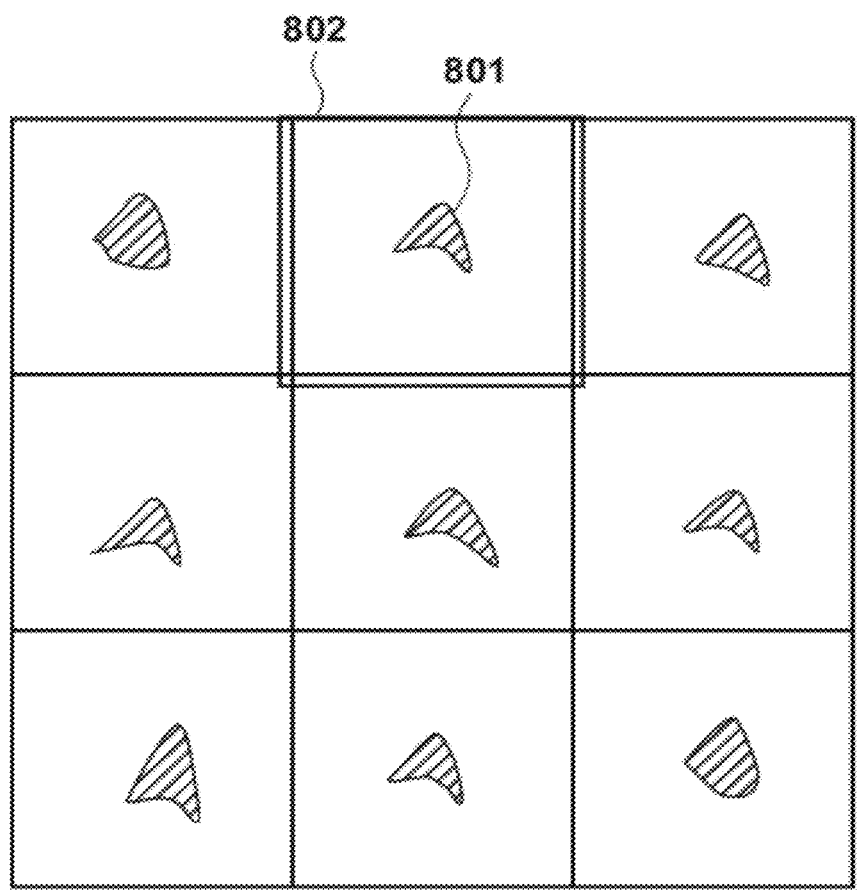
FIG. 8 is a view exemplifying division of an image and setting of a representative filter.

In FIG. 8, an image is divided into 3×3=9 areas. For an area 802, a filter of highest importance among filters corresponding to respective pixels in the area 802 is selected as a representative filter 801.

With this setting, the pixel positions of filters selected as representative filters are appropriately scattered within the area, and filters large in both the absolute value of the coefficient and size can be extracted. However, the method is not limited to the above one as long as representative filters can properly approximate filters different between pixels by the linear sum of a plurality of representative filters.

Details of the importance calculation unit 103 have been described.

<Processing by Weight Coefficient Calculation Unit 200>

Processing by the weight coefficient calculation unit 200 to calculate the weight vector w will be explained in more detail. A filter corresponding to the coordinate position (x',y') can be expressed as F(x−x',y−y',x',y'), and the representative filter fi can be expressed as fi(x−x',y−y').

In the embodiment, a weight value is decided to minimize the following evaluation value V:

$$V = \quad (3)$$

$$\sum_{x,y}\sum_{x',y'} \left| F(x-x', y-y', x', y') - \sum_{i=1}^{N} w_i(x', y') f_i(x-x', y-y') \right|^2$$

By minimizing the sum of squares of a difference from the filter F(x−x',y−y',x',y'), a weight value can be decided while reflecting the characteristic of the filter F(x−x',y−y',x',y'). To decide wi(x',y') to minimize V, V is partially differentiated by wi(x',y') and set as 0:

$$0 = \frac{\partial V}{\partial w_i(x', y')} = \quad (4)$$

$$2 \sum_{x,y} \left( \sum_{j=1}^{N} w_j(x', y') f_j(x-x', y-y') - F(x-x', y-y', x', y') \right)$$

$$f_i(x-x', y-y')$$

Rewriting equation (4) yields $$\sum_{j=1}^{N} \sum_{x,y} w_j(x', y') f_i(x-x', y-y') f_j(x-x', y-y') = \quad (5)$$

$$\sum_{x,y} f_i(x-x', y-y') F(x-x', y-y', x', y')$$

Equation (5) can be expressed as Aw=b, similar to equation (1), by converting variables in equation (5), like equations (6):

$$A_{ij} \equiv \sum_{x,y} f_i(x-x', y-y') f_j(x-x', y-y') \quad (6)$$

$$b_i \equiv \sum_{x,y} f_i(x-x', y-y') F(x-x', y-y', x', y')$$

By solving these equations, the weight vector w can be obtained. If there is no inverse matrix of A, the pseudo-inverse matrix of A is applied. The correlation vector calculation unit 203 calculates the correlation vector b in equations (6), and the correlation matrix calculation unit 204 calculates the correlation matrix A in equations (6).

Figure 9A:
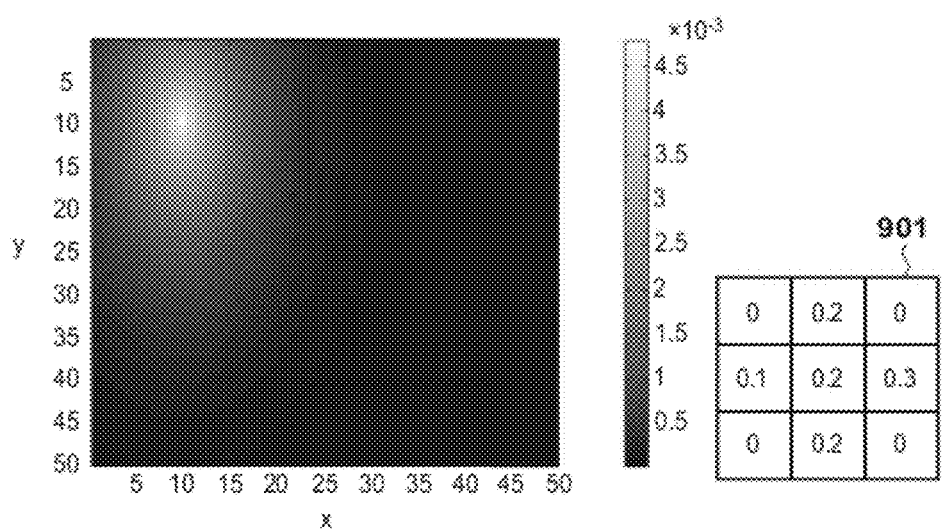
FIGS. 9A and 9B are views exemplifying the distributions of weight values for respective pixels in correspondence with a representative filter fi.
Figure 9B:
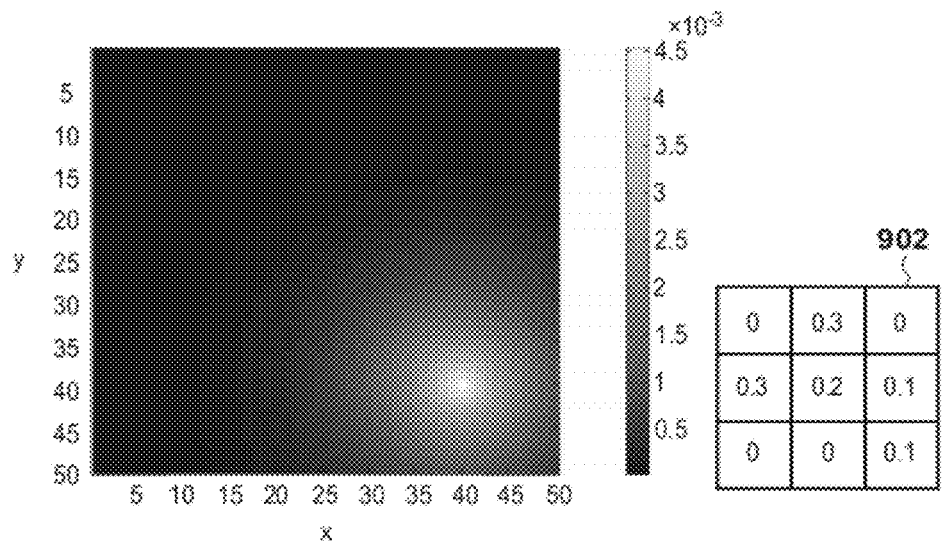

FIGS. 9A and 9B exemplify the distributions of weight values for respective pixels in correspondence with the representative filter fi. FIG. 9A shows a set of weight values corresponding to a first representative filter 901. FIG. 9B shows a set of weight values corresponding to a second representative filter 902. In the embodiment, the number of weight values for a single representative filter equals the number of pixels, so the number of weight values changes depending on an image. In FIGS. 9A and 9B, part of a set of weight values is cut out and only those for 50×50=2500 pixels are displayed for illustrative convenience. In FIGS. 9A and 9B, a white portion represents a large weight value. In FIGS. 9A and 9B, weight values are only positive values, but negative values are possible in general.

In the above description, the evaluation value V is given as represented by equation (3) for simplicity. However, more commonly, the evaluation value V may be weighted for each pixel position, as represented by equation (7):

$$V = \sum_{x,y}\sum_{x',y'} a(x', y') \quad (7)$$

$$\left| F(x-x', y-y', x', y') - \sum_{i=1}^{N} w_i(x', y') f_i(x-x', y-y') \right|^2$$

where a(x',y') is an appropriate weight coefficient. For example, it is considered that the filter needs to be reproduced more accurately for a higher-frequency area in an image. To do this, the value of the weight coefficient a(x',y') may be increased for a high-frequency image area. The method is not limited to the above one as long as the filter $F(x-x',y-y',x',y')$ can be properly approximated by the linear sum of representative filters and weight coefficients.

<Processing by Filter Operation Unit 300>

Filter processing by the filter operation unit 300 will be described in more detail. The array K satisfies equation (8):

$$K(x, y) = \sum_{x',y'} F(x-x', y-y', x', y')I(x', y') \quad (8)$$

In the embodiment, the filter $F(x-x',y-y',x',y')$ is approximated by expression (9):

$$F(x-x', y-y', x', y') \sim \sum_{i=1}^{N} w_i(x', y')f_i(x-x', y-y') \quad (9)$$

From the above equation, the action of the filter $F(x-x',y-y',x',y')$ on an input image can be approximated and expressed by equation (10):

$$K(x, y) = \sum_{x',y'} \sum_{i=1}^{N} w_i(x', y')f_i(x-x', y-y')I(x', y') = \quad (10)$$

$$\sum_{x',y'} \sum_{i=1}^{N} f_i(x-x', y-y')[w_i(x', y')I(x', y')]$$

The composition unit 306 achieves calculation of equation (10) by solving equation (11):

$$K(x, y) = \sum_{i=1}^{N} f_i(x, y) * J_i(x, y) \quad (11)$$

The above description is directed to processing using a filter set for each pixel. Processing using a filter set for each image area is as follows. First, an image is divided into R image areas, and a single filter is applied within the same region. At this time, a filter for the rth area can be represented by $F(x-x',y-y',r)$ ($1 \leq r \leq R$).

Then, the same processing as that described above is executed while replacing $w_i(x,y)$ with $w_i(r)$. Note that an index to calculate a sum changes from $(x',y')$ to k.

Figure 10:
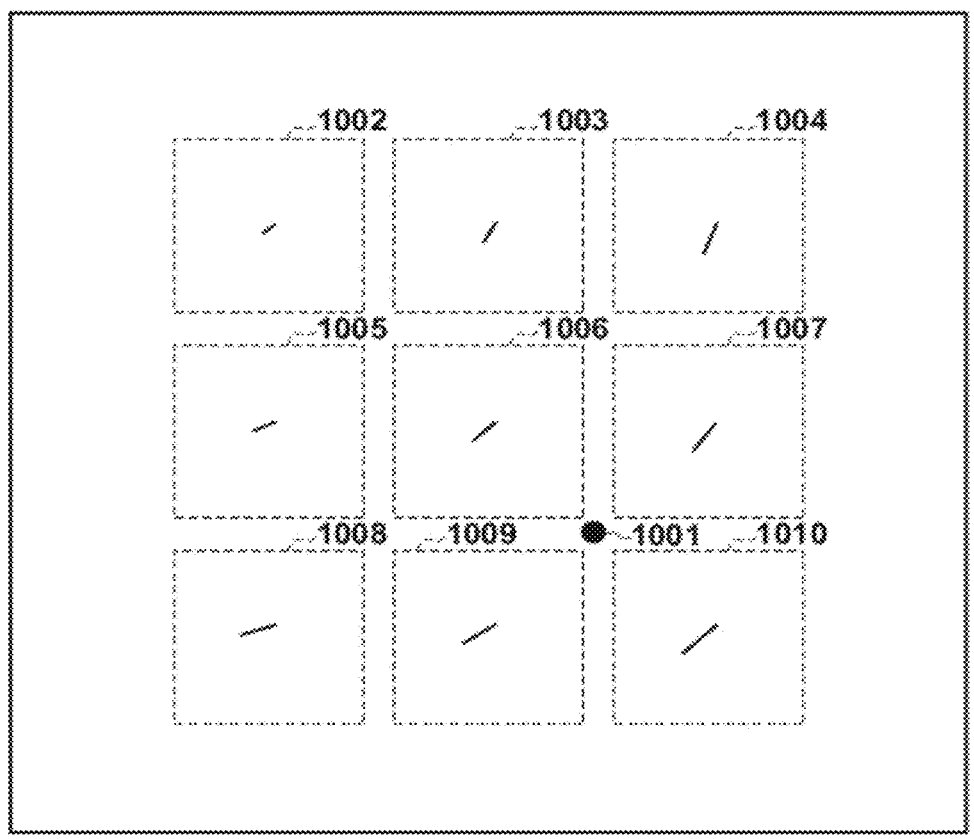
FIG. 10 is a view showing a shake filter for each location against a rotational camera shake centered on an upper left portion of an image.

FIG. 10 shows a shake filter for each location against a rotational camera shake centered on an upper left portion of an image. Although respective pixels originally have different shake filters, FIG. 10 shows only nine representative shake filters 1002 to 1010. The shake filters 1002 to 1010 shown in FIG. 10 are adopted as representative filters. At this time, approximation of a filter at a point 1001 will be examined.

Figure 11A:
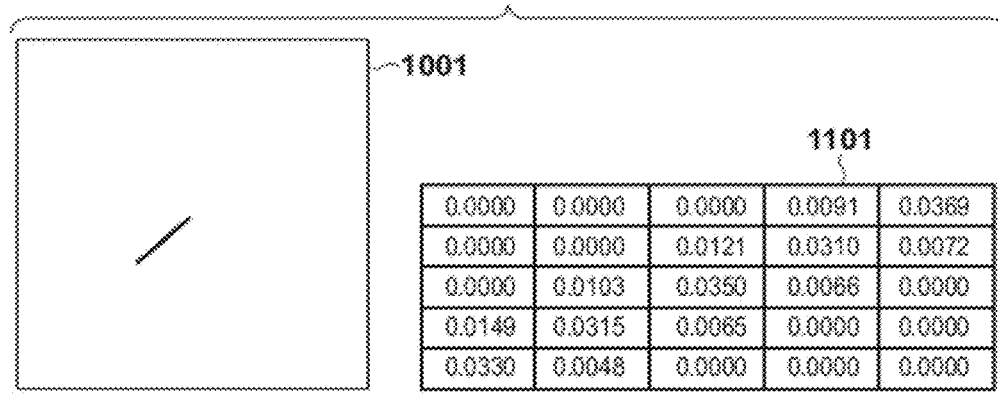
FIGS. 11A to 11C are views for explaining the effect of the first embodiment.
Figure 11B:
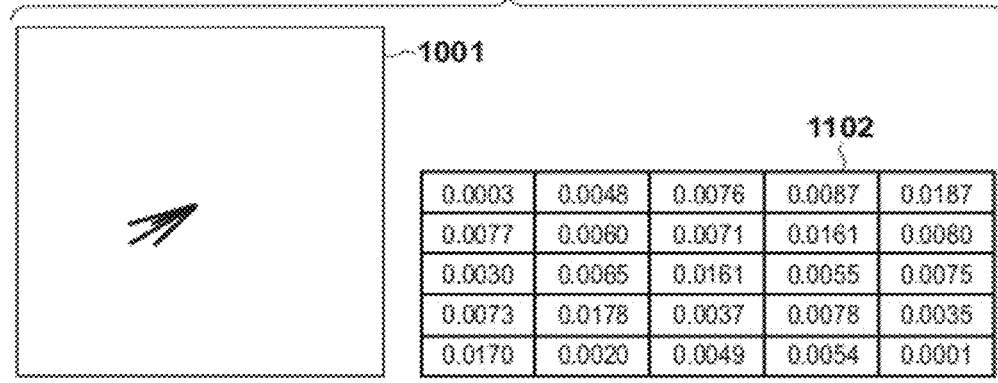
Figure 11C:
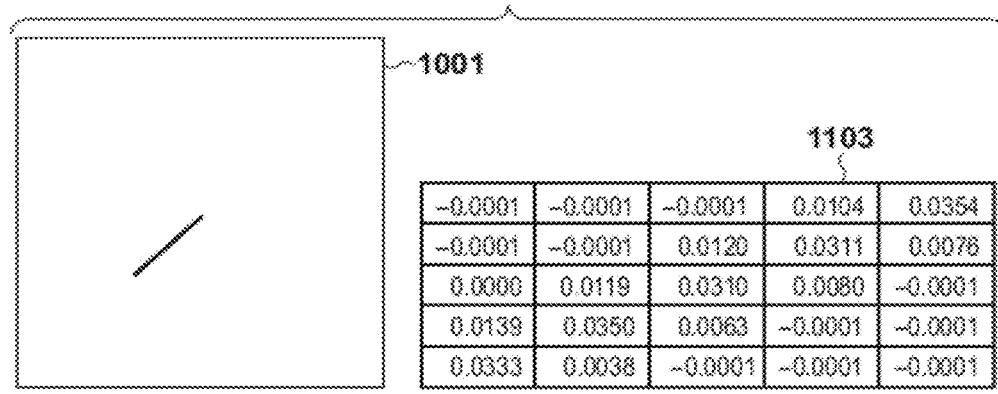

The effect of the first embodiment will be explained with reference to FIGS. 11A to 11C. FIG. 11A shows a filter at the point 1001. FIG. 11B shows an intermediate filter generated from the shake filters 1006, 1007, 1009, and 1010 by linear interpolation. FIG. 11C shows an intermediate filter generated from the shake filters 1002 to 1010 by processing according to the first embodiment. Tables 1101 to 1103 show numerical expressions of extracted parts of the filters in FIGS. 11A to 11C. The tables 1101 to 1103 extract the same parts from the filters in FIGS. 11A to 11C. As can be seen from FIGS. 11A to 11C, the generation method according to the first embodiment can generate a filter closer to one at the point 1001 than an intermediate filter generated by linear interpolation.

A memory capacity necessary in the embodiment and a calculation amount required when filters different between respective pixels act on an image will be examined. Here, the maximum filter size is $S^2$ (pixel) and the number of pixels of an image is $M^2$ (pixel).

A memory necessary to hold all filters different between respective pixels is $O((MS)^2)$ in where O is order. In the embodiment, a memory necessary to hold representative filters is $O(NS^2)$, a memory necessary to hold weight values is $O(NM^2)$, and thus a memory of $O(N(M^2+S^2))$ is needed in total.

Since the image size is generally larger than the filter size, $S^2<M^2$ and a necessary memory capacity is $O(NM^2)$. Thus, as the number N of representative filters is smaller than the number $S^2$ of filter elements, the memory reduction effect of the embodiment becomes more significant. For example, for N=9 and S=21 in the example of FIG. 10, the memory capacity is reduced to almost $9/21^2$ to 1/50.

A calculation amount required when filters act on an image will be considered. In the conventional method, filters act on respective pixels and the calculation amount is $O((MS)^2)$. According to the embodiment, $O(NM^2)$ is required to calculate $J_i(x',y')$ for the number N of representative filters in equation (11). In the embodiment, the operation of a filter on an image can be rewritten into convolution, so a calculation amount of $O(NM \log M)$ is necessary for calculation of equation (11) in the use of FFT. If the image is sufficiently large, $O(NM^2) >> O(NM \log M)$ and a calculation amount of $O(NM^2)$ is necessary for a filter to act on the image. Hence, as the number N of representative filters is smaller than the number $S^2$ of filter elements, the calculation amount reduction effect of the embodiment stands out much more. For example, for N=9 and S=21 in the example of FIG. 10, the calculation amount is reduced to almost $9/21^2$ to 1/50.

As described above, according to the first embodiment, filters different between pixels (areas) are approximated by linear coupling of representative filters and weight coefficients. A memory for storing filters and the amount of operation on an image can be reduced.

Note that the embodiment has exemplified a shake filter as a filter. However, the present invention is applicable to a filter for any purpose such as an optical blur or out-of-focusing corresponding to the object distance.

Second Embodiment

In the first embodiment, when acquiring representative filters, importances are assigned to filters and filters of high importance are acquired as representative filters. The second embodiment will describe a case in which representative filters are generated by linear coupling of filters using principal component analysis.

Figure 12:
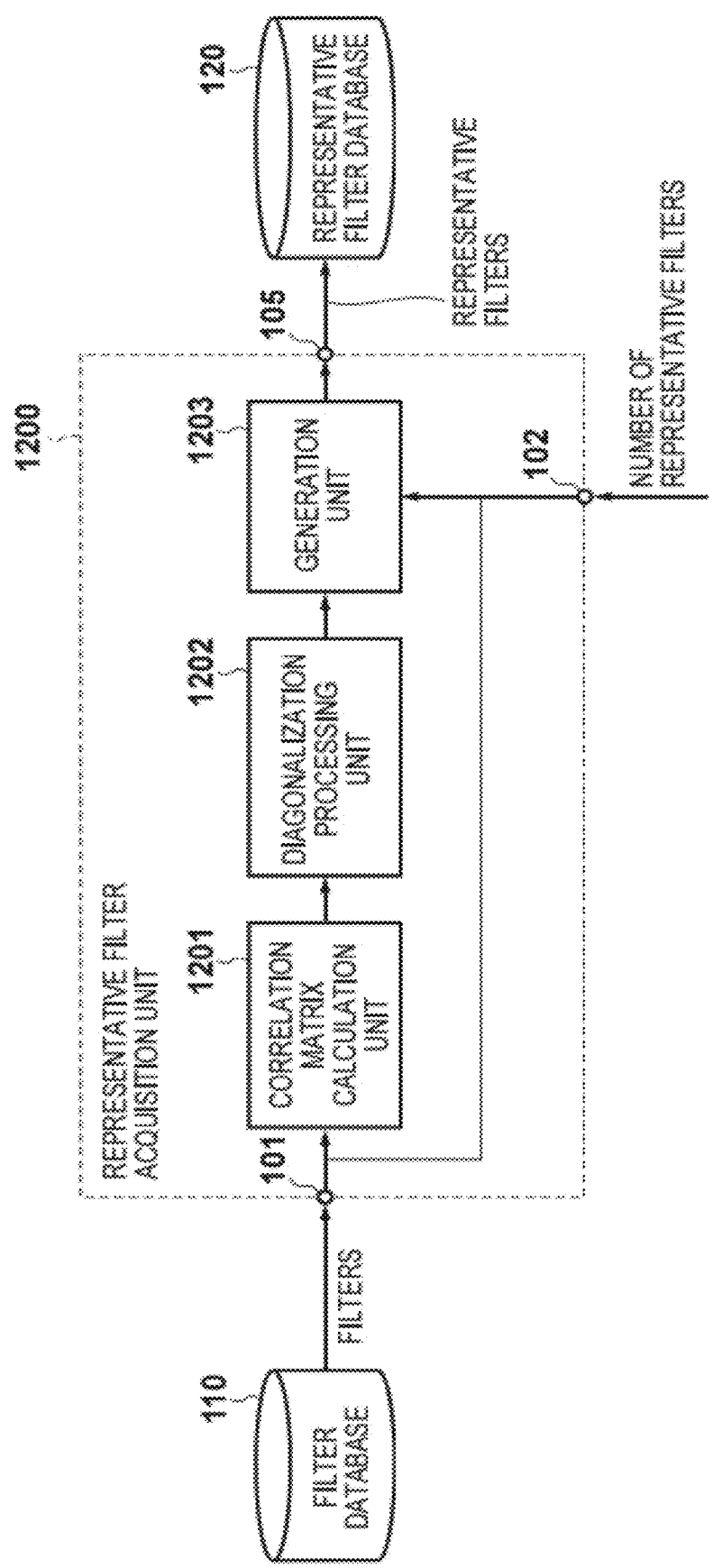
FIG. 12 is a block diagram exemplifying the functional arrangement of an image processing apparatus.

An image processing apparatus according to the second embodiment is different from that in the first embodiment only in that it has an arrangement shown in FIG. 12 instead of the arrangement shown in FIG. 1. The arrangement shown in FIG. 12 will be explained. Even in the second embodiment, the arrangement shown in FIG. 12 may be assembled into separate apparatuses.

The arrangement shown in FIG. 12 is configured to generate, as representative filters from filters set in advance for respective pixels which form an image, main filters which approximate these filters.

A representative filter acquisition unit 1200 includes a correlation matrix calculation unit 1201, a diagonalization processing unit 1202, a generation unit 1203, and terminals 101, 102, and 105.

The correlation matrix calculation unit 1201 reads out filters for respective pixels that are stored in a filter database 110, and calculates the correlation matrix between the filters. The diagonalization processing unit 1202 obtains the eigenvectors and eigenvalues of the correlation matrix calculated by the correlation matrix calculation unit 1201. Note that the eigenvectors are set to be orthogonal to each other (since the correlation matrix is a symmetric matrix, eigenvectors can be set to be orthogonal to each other). The generation unit 1203 first acquires the number N of representative filters via the terminal 102. Then, the generation unit 1203 linearly couples eigenvectors and filters in descending order of the eigenvalue, generating representative filters.

Figure 13:
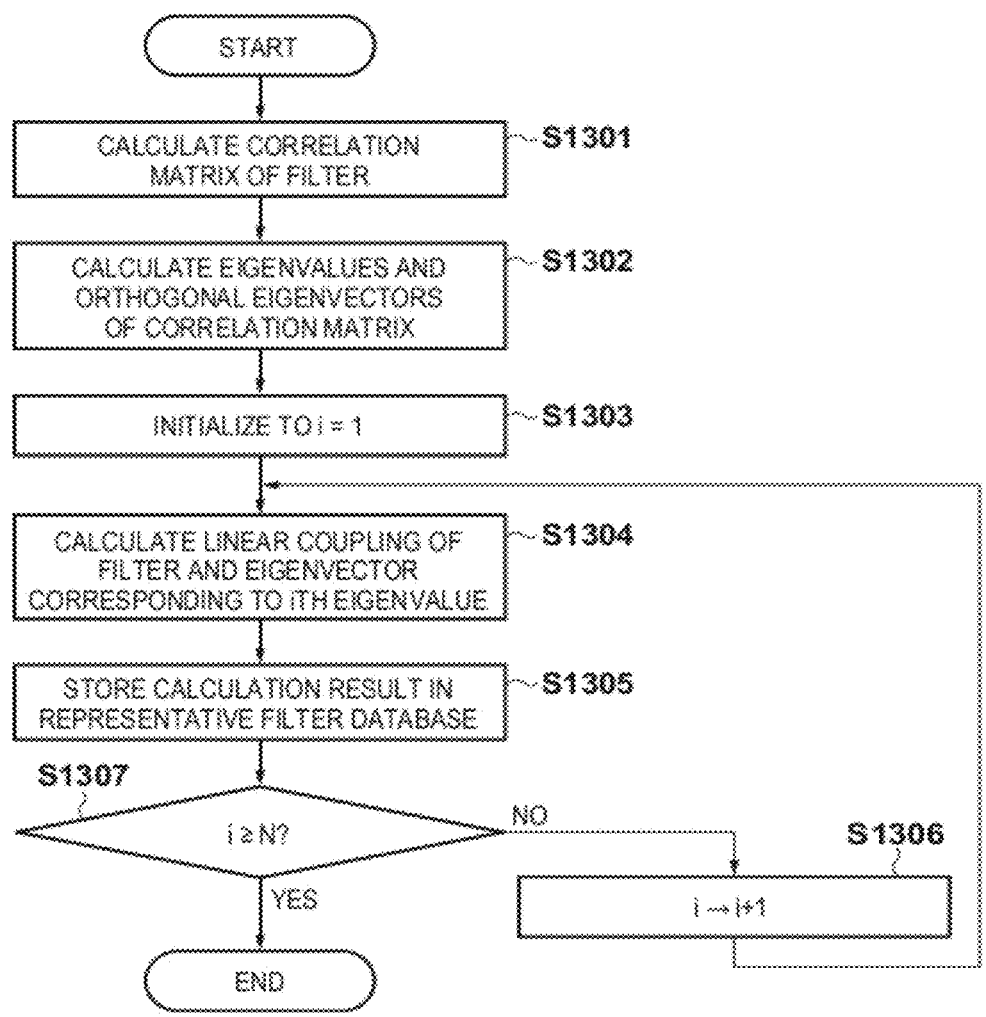
FIG. 13 is a flowchart showing processing by a representative filter acquisition unit 1200.

Next, processing by the representative filter acquisition unit 1200 will be described with reference to FIG. 13 showing the sequence of this processing.

In step S1301, the correlation matrix calculation unit 1201 reads out, via the terminal 101, filters for respective pixels that are stored in the filter database 110. The correlation matrix calculation unit 1201 then calculates correlation matrices between the readout filters. The correlation matrix may be a correlation matrix between different filters or one between identical filters.

In step S1302, the diagonalization processing unit 1202 diagonalizes each correlation matrix calculated in step S1301, obtaining eigenvalues and eigenvectors. The diagonalization processing unit 1202 assigns indices of 1, 2, 3, . . . to eigenvalues in descending order of the value.

In step S1303, the generation unit 1203 initializes a variable i used below to 1. In step S1304, the generation unit 1203 calculates linear coupling of filters and eigenvectors corresponding to eigenvalues assigned with indices of the value of the variable i, obtaining the linear coupling result as the ith representative filter. Details of the processing in this step will be described later.

In step S1305, the generation unit 1203 registers the obtained ith representative filter in a representative filter database 120 via the terminal 105. In step S1307, the generation unit 1203 determines whether the value of the variable i is equal to or larger than the number N of representative filters. If the value of the variable i≥N as a result of the determination, the process ends; if the value of the variable i<N, advances to step S1306. In step S1306, the generation unit 1203 increments the value of the variable i by one, and performs the processes in steps S1304 and subsequent steps.

Details of the processing in step S1304 will be explained. The representative filter acquisition unit 1200 generates a representative filter using principal component analysis. The representative filter is generated by linear coupling of filters. The ith representative filter fi(x,y) is generated in accordance with equation (12):

$$f_i(x, y) = \sum_{x',y'} F(x, y, x', y') v_i(x', y') \qquad (12)$$

where vi is a weight for the ith representative filter fi. Although vi is a two-dimensional array, it can be handled as a vector by rearranging vi(x',y') in line from upper left to lower right.

The correlation matrix calculation unit 1201 calculates a correlation matrix by solving equation (13):

$$C_F(x', y', x'', y'') = \sum_{x,y} F(x, y, x', y') F(x, y, x'', y'') \qquad (13)$$

$C_F$ also has four suffixes, but can be handled as a matrix by the same rearrangement as that of vi.

The diagonalization processing unit 1202 diagonalizes the correlation matrix $C_F$, obtaining the weights vi as eigenvectors. The generation unit 1203 extracts eigenvectors sequentially in descending order of the eigenvalue, and generates a representative filter in accordance with equation (12).

In the first embodiment, a filter of high importance is acquired directly as a representative filter from filters. To the contrary, in the second embodiment, a representative filter with high contribution is generated by linear coupling of filters using principal component analysis. Hence, a filter can be approximated more accurately by a smaller number of representative filters than those in the first embodiment.

Third Embodiment

The first embodiment has described a method of decomposing filters different between pixel positions (areas) into representative filters and weight coefficients, and approximating filters. The third embodiment will describe filter decomposition when the filter changes depending on the pixel position (area) and pixel value. Only a difference from the first embodiment will be described below.

Figure 14:
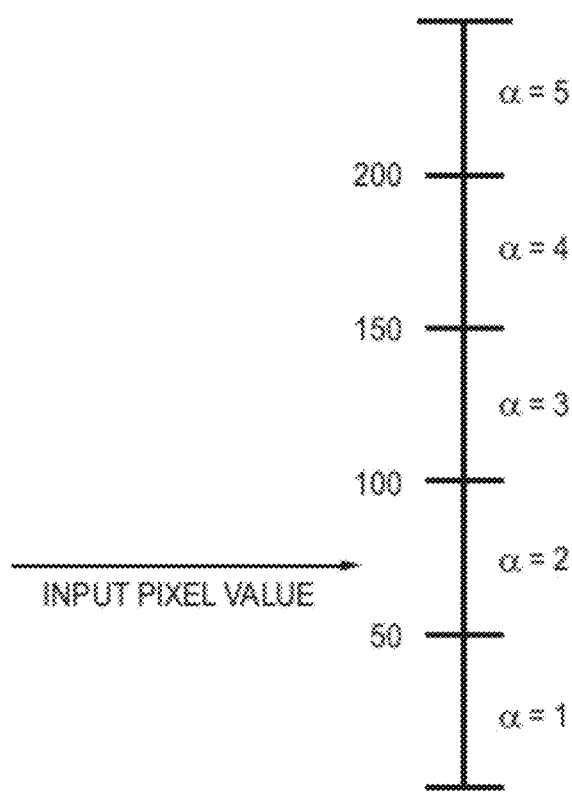
FIG. 14 is a view for explaining a filter.

In the third embodiment, Q filters are registered in a filter database 110 for respective pixel positions. For example, as shown in FIG. 14, the possible range (0 to 255 in FIG. 14) of a pixel value is divided into 5 (=Q), and indices such as α=1, 2, 3, 4, 5 are assigned to the respective divided areas. In this case, filters corresponding to α=1 to 5 are registered in the filter database 110 for respective pixel positions. For example, when a pixel value at a coordinate position of interest in an input image is a value at a position indicated by an arrow in FIG. 14, a filter corresponding to α=2 out of five filters corresponding to the coordinate position of interest is selected as a filter for this coordinate position.

The basic concept is the same as those in the first and second embodiments, and a filter is approximated by linear coupling of representative filters and weight coefficients. More specifically, filter F(x−x',y−y',x',y',α) is approximated according to expression (14):

$$\sum_{i=1}^{N} w_i(x', y', \alpha) f_i(x - x', y - y') \qquad (14)$$

Unlike the first and second embodiments, the weight vector w depends on α. The remaining operation is the same as that in the first embodiment. A correlation vector calculation unit 203 in a weight coefficient calculation unit 200 calculates a coefficient value by solving equation (15):

$$b_i \equiv \sum_{x,y} f_i(x - x', y - y') F(x - x', y - y', x', y', \alpha) \qquad (15)$$

The remaining operation is the same as that in the first embodiment.

A weight coefficient multiplication unit 304 in a filter operation unit 300 calculates Ji(x',y')=wi(x',y',α)×I(x',y'). At this time, α is determined from the pixel value I(x',y'). The remaining operation is the same as that in the first embodiment.

A representative filter acquisition unit 1200 generates a representative filter based on equation (16):

$$f_i(x, y) = \sum_{x',y',\alpha} F(x, y, x', y', \alpha) v_i(x', y', \alpha) \quad (16)$$

Although vi is a three-dimensional array, it is converted into a two-dimensional array vi(X,α) by rearranging vi(x',y', a) in line from upper left to lower right while fixing α. Further, vi(X,α) is rearranged in line from upper left to lower right, and vi can therefore be handled as a vector.

A correlation matrix calculation unit 1201 calculates a correlation matrix by solving equation (17):

$$C_F(x', y', x'', y''\alpha, \alpha') = \sum_{x,y} F(x, y, x', y', \alpha) F(x, y, x'', y'', \alpha') \quad (17)$$

$C_F$ has six suffixes, but can be handled as a matrix by the same rearrangement as that of vi. The remaining operation is the same as that in the second embodiment.

As described above, according to the third embodiment, filters different between pixel positions (areas) and pixel values are approximated by linear coupling of representative filters and weight coefficients. A memory for storing filters and the amount of operation on an image can be reduced.

Fourth Embodiment

The respective units shown in FIGS. 1, 2, 3, and 12 may be implemented as hardware, or some or all of them may be implemented as software (computer program). For example, a filter database 110, representative filter database 120, and weight coefficient database 210 are registered in a large-capacity information storage device typified by a hard disk drive device. The remaining units are installed as computer programs in a computer. In addition, information described as known one in the above-described processing, image data to be processed, and the like are also stored in the computer. The large-capacity information storage device is connected to the computer.

Then, the CPU of the computer executes processing using the installed computer program, data, and various databases registered in the large-capacity information storage device, implementing the processes described in the above embodiments.

Note that the above-described embodiments may be properly combined or switched and used. The arrangements of the above-described embodiments may be properly changed as long as the purpose of the invention can be achieved, and the above arrangements are merely examples.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-283729 filed Dec. 20, 2010 which is hereby incorporated by reference herein in its entirety.

What is claimed is:

1. An image processing apparatus comprising:
   an image acquisition unit that acquires an image;
   a filter acquisition unit that acquires, for each pixel contained in the image, information indicating an original filter set for each pixel;
   a selection unit that selects plural representative filters from the original filters indicated by the acquired information for each pixel, wherein a number of selected representative filters is less than a number of original filters indicated by the information;
   a determination unit that determines, for each pixel contained in the image, a weight vector which defines weights for the selected representative filters on the basis of the selected representative filters and the original filter set for the pixel; and
   a performing unit that performs a filtering process for the image by applying, to each pixel contained in the image, the weight vector of the pixel and the selected representative filters.

2. The apparatus according to claim 1, further comprising:
   a unit that holds original filters to be applied to the pixels for the respective pixels which form the image,
   wherein said selection unit assigns a higher importance to a filter formed from a larger coefficient value among the original filters and selects, as representative filters, a predetermined number of filters from the original filters in descending order of importance.

3. The apparatus according to claim 1, further comprising:
   a unit that acquires, as first correlations for each pixel contained in the image, correlations between the original filters to be applied to the pixels and the selected representative filters; and
   a unit that acquires correlations between the selected representative filters as second correlations,
   wherein said determination unit determines respective weight vectors based on the first correlations and the second correlations.

4. The apparatus according to claim 3, wherein said determination unit determines, as the weight vectors for the respective pixels which form the image, vectors each of which is to be multiplied by a correlation matrix indicating the correlations between the selected representative filters in order to obtain correlation vectors indicating the first correlations and contains weight values for the selected representative filters as components.

5. The apparatus according to claim 1, wherein an original filter to be applied to a pixel of interest is a filter formed from coefficients by which pixels including the pixel of interest and peripheral pixels around the pixel of interest are multiplied.

6. The apparatus according to claim 1, wherein an original filter to be applied to a pixel of interest is a filter corresponding to a pixel value of the pixel of interest.

7. The apparatus according to claim 1, further comprising:
a unit that holds original filters to be applied to the pixels for the respective pixels which form the image,
wherein said selection unit assigns a higher importance to a filter of a larger size among the original filters and selects, as representative filters, a predetermined number of filters from the original filters in descending order of importance.

8. A non-transitory computer-readable storage medium storing a computer program for causing a computer to function as each units of an image processing apparatus defined in claim 1.

9. The apparatus according to claim 1, wherein said performing unit composites plural images, which are obtained by applying, to each pixel contained in the image, the weight vector of the pixel and the selected representative filters, to acquire a composite image as a result of the filtering process for the image.

10. The apparatus according to claim 9, wherein each of the plural images is obtained by applying a selected one of the selected representative filters and weight values for the selected one in respective weight vectors to the image.

11. The apparatus according to claim 1, wherein said performing unit performs a process for weighting the image by multiplying pixel values contained in the image by weight values for a selected one of the selected representative filters and for applying the selected one to the weighted image, and composites the filtered images obtained by performing the process for the selected representative filters.

12. The apparatus according to claim 1, wherein said performing unit performs the filtering process for the image by applying linear coupling of the selected representative filters and the weight vectors to the image.

13. An image processing apparatus according to claim 1, further comprising:
an assigning unit that assigns importance for each original filter,
wherein said selection unit selects the plural representative filters based on the importance assigned for each original filter.

14. An image processing apparatus according to claim 13, wherein said selection unit selects, as the representative filters, a predetermined number of original filters in descending order of the importance.

15. The apparatus according to claim 14, wherein said assigning unit assigns a higher importance to a filter formed from a larger coefficient value among the original filters indicated by the information.

16. The apparatus according to claim 14, wherein said assigning unit assigns a higher importance to a filter of a larger size among the original filters indicated by the information.

17. An image processing method to be performed by an image processing apparatus, comprising the steps of:

acquiring for each pixel contained in an image, information indicating an original filter set for each pixel;

selecting plural representative filters from the original filters indicated by the acquired information for each pixel, wherein a number of the selected representative filters is less than a number of original filters indicated by the information;

determining, for each pixel contained in the image, a weight vector which defines weights for the selected representative filters on the basis of the selected representative filters and the original filter set for the pixel; and performing a filtering process for the image by applying, to each pixel contained in the image, the weight vector of the pixel and the selected representative filters.

18. An image processing apparatus comprising:
an image acquisition unit that acquires an image;
a filter acquisition unit that acquires, for each image area contained in the image, information indicating an original filter set for each image area;
a selection unit that selects plural representative filters from the original filters indicated by the acquired information for each image area, wherein a number of the selected representative filters is less than a number of the original filters indicated by the information;
a determination unit that determines, for each image area contained in the image, a weight vector which defines weights for the selected representative filters on the basis of the selected representative filters and the original filter set for the image area; and
a performing unit that performs a filtering process for the image by applying, to each image area contained in the image, the weight vector of the image area and the selected representative filters.

19. An image processing apparatus comprising:
an image acquisition unit that acquires an image;
a filter acquisition unit that acquires information indicating plural original filters, wherein each pixel contained in the image corresponds to at least one of the plural original filters;
a selection unit that selects plural representative filters from the original filters indicated by the acquired information, wherein a number of the selected representative filters is less than a number of the original filters indicated by the information;
a determination unit that determines, for each pixel contained in the image, a weight vector which defines weights defining influence of the selected representative filters on the basis of the selected representative filters and the original filter corresponding to the pixel; and
a performing unit that performs a filtering process for the image by applying, to each pixel contained in the image, the weight vector of the pixel and the selected representative filters.

* * * * *